(12) United States Patent
Wei

(10) Patent No.: US 9,939,661 B2
(45) Date of Patent: Apr. 10, 2018

(54) LIGHTWEIGHT BONE CONDUCTION BLUETOOTH GLASSES

(71) Applicant: HANGZHOU SHUANGWANYUE ELECTRONIC TECHNOLOGY CO., LTD., Hangzhou, Zhejiang (CN)

(72) Inventor: Qiang Wei, Zhejiang (CN)

(73) Assignee: HANGZHOU SHUANGWANYUE ELECTRONIC TECHNOLOGY CO., LTD., Hangzhou (CN)

( * ) Notice: Subject to any disclaimer, the term of this patent is extended or adjusted under 35 U.S.C. 154(b) by 141 days.

(21) Appl. No.: 15/028,038

(22) PCT Filed: Jul. 30, 2014

(86) PCT No.: PCT/CN2014/083319
§ 371 (c)(1),
(2) Date: Apr. 8, 2016

(87) PCT Pub. No.: WO2015/109810
PCT Pub. Date: Jul. 30, 2015

(65) Prior Publication Data
US 2016/0246076 A1  Aug. 25, 2016

(30) Foreign Application Priority Data
Jan. 26, 2014 (CN) .......................... 2014 1 0038650

(51) Int. Cl.
*G02C 1/00* (2006.01)
*G02C 11/00* (2006.01)
(Continued)

(52) U.S. Cl.
CPC ............. *G02C 11/10* (2013.01); *G02C 5/02* (2013.01); *G02C 5/12* (2013.01); *G02C 5/143* (2013.01);
(Continued)

(58) Field of Classification Search
CPC .......... G02C 11/10; G02C 11/06; G02C 5/14; G02C 5/143
(Continued)

(56) References Cited

U.S. PATENT DOCUMENTS

2001/0038436 A1* 11/2001 Schuchard ........... G02C 5/2236
351/113
2002/0003604 A1* 1/2002 Yaguchi ................. G02C 5/143
351/122
(Continued)

FOREIGN PATENT DOCUMENTS

| CN | 2537026 Y | 2/2003 |
|---|---|---|
| CN | 201156128 Y | 11/2008 |

(Continued)

OTHER PUBLICATIONS

International Search Report of PCT Patent Application No. PCT/CN2014/083319 dated Oct. 27, 2014.
(Continued)

*Primary Examiner* — Hung Dang

(57) ABSTRACT

The invention relates to the field of electronic information technology and discloses lightweight bone conduction Bluetooth glasses, including glasses frames, glasses legs, glasses feet, a nose bridge and nose pads, wherein a lithium battery and a Bluetooth circuit board are set within the glasses legs, bone conduction speakers are set within both glasses feet, a microphone is set within the glasses legs or on the nose bridge or the nose pads, conducting wires are set within the glasses frames, the glasses legs and the glasses feet, and the microphone, the lithium battery, the Bluetooth circuit board and the bone conduction speaker are connected through the conducting wires. The bone conduction Bluetooth glasses of the invention are similar to ordinary glasses, and the user can answer the call without taking a
(Continued)

mobile phone out, thus freeing both hands and ears, hearing and speaking clearly, protecting privacy, and reducing radiation.

10 Claims, 4 Drawing Sheets

(51) Int. Cl.
| | |
|---|---|
| G02C 11/06 | (2006.01) |
| H04R 1/02 | (2006.01) |
| H04R 1/10 | (2006.01) |
| G02C 5/02 | (2006.01) |
| G02C 5/12 | (2006.01) |
| G02C 5/14 | (2006.01) |
| G02C 5/16 | (2006.01) |
| G02C 5/22 | (2006.01) |

(52) U.S. Cl.
CPC ............ *G02C 5/16* (2013.01); *G02C 5/2254* (2013.01); *G02C 11/06* (2013.01); *H04R 1/028* (2013.01); *H04R 1/1041* (2013.01); *H04R 2201/107* (2013.01); *H04R 2420/07* (2013.01); *H04R 2430/01* (2013.01); *H04R 2460/13* (2013.01)

(58) Field of Classification Search
USPC ............. 351/122, 158, 153, 113, 41; 16/228
See application file for complete search history.

(56) References Cited

U.S. PATENT DOCUMENTS

2010/0045928 A1\* 2/2010 Levy ...................... H04M 1/05
351/158
2010/0110368 A1 5/2010 Chaum

FOREIGN PATENT DOCUMENTS

| CN | 103220612 A | 7/2013 |
|---|---|---|
| CN | 203181220 U | 9/2013 |
| CN | 203250083 U | 10/2013 |
| CN | 203369501 U | 1/2014 |

OTHER PUBLICATIONS

1st Office Action of counterpart Chinese Patent Application No. 201410038650.5 dated Aug. 28, 2014.

\* cited by examiner

LIGHTWEIGHT BONE CONDUCTION BLUETOOTH GLASSES

FIELD OF THE INVENTION

The invention relates to the field of electronic information technology, in particular to a kind of lightweight bone conduction Bluetooth glasses.

BACKGROUND

The bluetooth headset applies Bluetooth technology to a hand-free headset, to let users avoid the inconvenience of wires, and freely make an easy call in various ways. But for the case in the need of wearing glasses, wearing Bluetooth headset will bring some inconvenience and poor decorativeness, leading to inconvenience to answer a call.

SUMMARY OF THE INVENTION

In light of disadvantages of the prior art, the invention provides a kind of lightweight bone conduction Bluetooth glasses.

In order to solve the technical problems above, the invention solves them by the technical solutions below:

Lightweight bone conduction Bluetooth glasses include glasses frames, glasses legs, glasses feet, a nose bridge and nose pads, wherein a lithium battery and a Bluetooth circuit board are set within the glasses legs, bone conduction speakers are set within both glasses feet, a microphone is set within the glasses legs or on the nose bridge or the nose pads, conducting wires are set within the glasses frames, the glasses legs and the glasses feet, and the microphone, the lithium battery, the Bluetooth circuit board and the bone conduction speaker are connected through the conducting wires. The glasses frames have the same materials and shapes as ordinary glasses frames, and are diverse and beautiful, the glasses legs can be formed by plastic injection molding or by tubing, the lithium battery and the Bluetooth circuit board can be set on two glasses legs respectively, or set on one glasses leg together, the lithium battery can supply power for the whole system, the Bluetooth circuit board is a control circuit which controls the microphone and the bone conduction speaker and is in wireless connection with the mobile phone, the microphone could be a common microphone or can be a bone conduction microphone, and while it is a common microphone, it can be set at any position on the nose bridge, the glasses frames or the glasses legs. Bone conduction speakers are set within both glasses feet, and the bone conduction speaker utilizes a transmission mode through bone vibration, thus both ears are relatively free, which can hear the sound both around us and in the bone conduction speaker, and make a general dialogue without accidents caused by not hearing the sound outside, and can also hear the sound very clearly in serious noisy environments. There is no need to put the bone conduction speaker into people's ears, the inside parts of the ears can be protected, and the surface of the bone conduction speaker is smooth and easy to clean, and has excellent waterproofness and long service life, the bone conduction speaker is put on the bone on the back of the ears to answer the call when in use, and the bone conduction speaker can have a variety of shapes such as circular, rectangular, or diamond shape.

Preferably, the microphone set on the nose pads is a bone conduction microphone. The bone conduction microphone has stronger resistance to the outside background sound source, noise and the like, the microphone can also be a common microphone, and while it is a common microphone, it can be set at any position on the glasses frames or the glasses legs without affecting the appearance.

Preferably, the glasses legs and the glasses feet are split type, connected by a rotating shaft, and a diaphragm is set on the bone conduction speaker within the glasses feet. The glasses feet can rotate around the rotating shaft, when the call is got through, the glasses feet can be slightly turned by hands to allow the bone conduction speaker and the diaphragm set on the bone conduction speaker to be attached on the bone on the back of the ears for answering the call, it does not affect the appearance of the glasses and is convenient to operate and easy to use, and in the seasons except summer, the bone conduction speaker and the diaphragm can be attached on the bone on the back of the ears, for answering the call and listening to music.

Preferably, stepped holes are set within the glasses feet, the bone conduction speaker is set in the stepped holes, and the diaphragm is set on the bone conduction speaker. The glasses legs and the glasses feet can also be integrated type, stepped holes are set within the glasses feet, and the bone conduction speaker is put into the stepped holes; when the call is got through, the bone conduction speaker is pushed out to allow the bone conduction speaker and the diaphragm setting on the bone conduction speaker to be attached on the bone on the back of the ears for answering the call, and after the call is hung up, the bone conduction speaker can be pushed into the glasses feet to keep esthetic and is convenient and efficient to use, and in the seasons except summer, the bone conduction speaker and the diaphragm can be attached on the bone on the back of the ears, for answering the call and listening to music.

Preferably, the glasses legs and the glasses feet are split type, the glasses feet are metal hose glasses feet, and the diaphragm is set on the bone conduction speaker within the glasses feet. While the glasses legs and the glasses feet are split type, the glasses feet are metal hose and can be twisted and stretched, when the call is got through, the metal hose glasses feet can be pressed by hands, the bone conduction speaker and the diaphragm set on the bone conduction speaker are attached on the bone on the back of the ears for answering the call, and after the call is hung up, the glasses feet are pushed away by hands to keep esthetic and is convenient and efficient to use, and in the seasons except summer, the bone conduction speaker and the diaphragm can be attached on the bone on the back of the ears, for answering the call and listening to music.

Preferably, the glasses legs and the glasses feet are split type, the glasses legs and the glasses feet are connected by a spring hinge device, and the diaphragm is set on the bone conduction speaker within the glasses feet.

Preferably, the spring hinge device includes an avicularium, a core assembly, a spring housing sheathed outside the core assembly and a screw connecting the avicularium and the core assembly, the core assembly includes a single-teeth core, a mandrel fixed on the single-teeth core, a spring and a clamp spring sheathed on the mandrel, one end of the spring is connected to the mandrel, and the other end is connected to the clamp spring, the clamp spring is a sleeve consisting of six forks, the clamp spring is stuck in a groove within the spring housing, the avicularium is connected with the glasses legs, and the spring housing is connected with the glasses feet, and can be fixed by a screw or pressed in by injection molding. When in use, the glasses feet are turned by hand, and the glasses feet turn around the screw to allow the bone conduction speaker and the diaphragm to be attached on the bone on the back of the ears, the single-teeth core and the clamp spring clamp the spring, and when reset, the glasses feet are turned back by hands, and the glasses feet are driven to reset by the reset action of the spring.

Preferably, a touch switch button and a volume adjusting button are set on the glasses legs, and the touch switch button and the volume adjusting button are connected with the Bluetooth circuit board through the conducting wires. The touch switch button can put through and cut off the call, and the volume adjusting button is used for adjusting the volume.

Preferably, the bone conduction speaker can have a variety of shapes such as circular, rectangular, or diamond shapes which are fashionable and esthetic.

The invention has significant technical effects due to the technical solutions above: the lightweight bone conduction Bluetooth glasses includes glasses frames, glasses legs, glasses feet, a nose bridge and nose pads, wherein a lithium battery and a Bluetooth circuit board are set within the glasses legs, bone conduction speakers are set within both glasses feet, a microphone is set within the glasses legs or on the nose bridge or the nose pads, conducting wires are set within the glasses frames, the glasses legs and the glasses feet, and the microphone, the lithium battery, the Bluetooth circuit board and the bone conduction speaker are connected through the conducting wires. The glasses legs and the glasses feet are split type, connected by a rotating shaft, or the glasses legs and the glasses feet are split type, the glasses feet are metal hose glasses feet, or the glasses legs and the glasses feet are split type, connected by a spring hinge device, and the glasses legs and the glasses feet can also be integrated type, stepped holes are set within the glasses feet, the bone conduction speaker is set in the stepped hole, and a diaphragm is set on the bone conduction speaker. The bone conduction Bluetooth glasses of the invention are similar to ordinary glasses, and meanwhile provided with the Bluetooth circuit board, the microphone and the bone conduction speaker additionally, and the user can answer the call without taking a mobile phone out, thus freeing both hands and ears, hearing and speaking clearly, protecting privacy, and reducing radiation when answering the call through the bone conduction speaker.

The parts represented by various numerical labels are as follows: 1—glasses frame, 2—glasses leg, 3—lithium battery, 4—conducting wire, 5—nose pad, 6—microphone, 7—Bluetooth circuit board, 8—touch switch button, 9—volume adjusting button, 10—glasses feet, 11—rotating shaft, 12—bone conduction speaker, 13—diaphragm, 14—stepped hole, 15—spring hinge device, 16—nose bridge, 151—avicularium, 152—screw, 153—core assembly, 154—spring housing, 155—single—teeth core, 156—mandrel, 157—clamp spring, 158—six forks, 159—groove, and 1510—spring.

DESCRIPTION OF THE PREFERRED EMBODIMENTS

The invention will be further described in details in conjunction with the drawings and Embodiments below.

Embodiment 1

Figure 1:
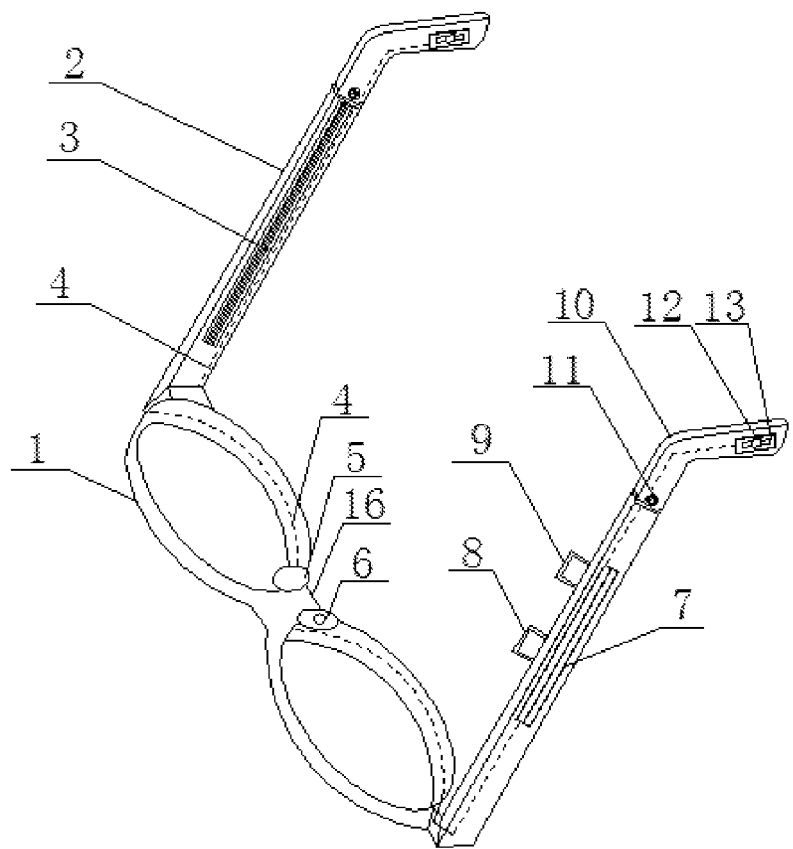
FIG. 1 is a structural schematic diagram of Embodiment 1 of the invention.
Figure 2:
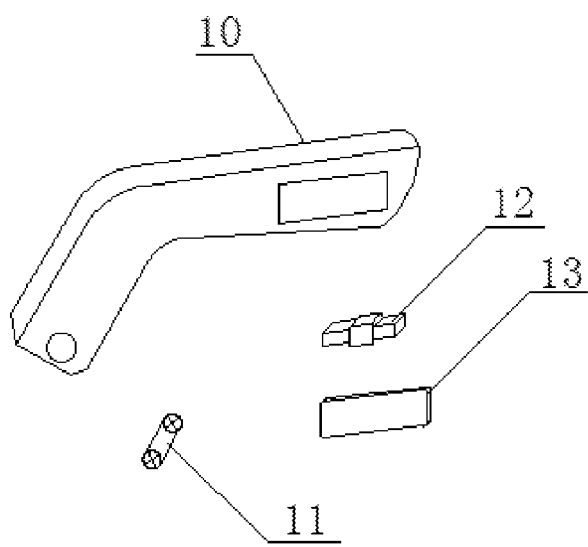
FIG. 2 is a structural schematic diagram of the glasses feet in FIG. 1.

Lightweight bone conduction Bluetooth glasses, as shown in FIG. 1-2, include glasses frames 1, glasses legs 2, glasses feet 10, a nose bridge 16 and nose pads 5, wherein a lithium battery 3 and a Bluetooth circuit board 7 are set within the glasses legs 2, bone conduction speakers 12 are set within both glasses feet 10, a microphone 6 is set on the nose pads 5, conducting wires 4 are set within the glasses frames 1, the glasses legs 2 and the glasses feet 10, and the microphone 6, the lithium battery 3, the Bluetooth circuit board 7 and the bone conduction speaker 12 are connected through the conducting wires 4. The microphone 6 set on the nose pads 5 is a bone conduction microphone. The glasses legs 2 and the glasses feet 10 are split type, connected by a rotating shaft 11, and a diaphragm 13 is set on the bone conduction speaker 12 within the glasses feet 10. A touch switch button 8 and a volume adjusting button 9 are set on the glasses legs 2, the touch switch button 8 and the volume adjusting button 9 are connected with the Bluetooth circuit board 7 through the conducting wires 4, and the shape of the bone conduction speaker 12 is rectangular.

Embodiment 2

Figure 3:
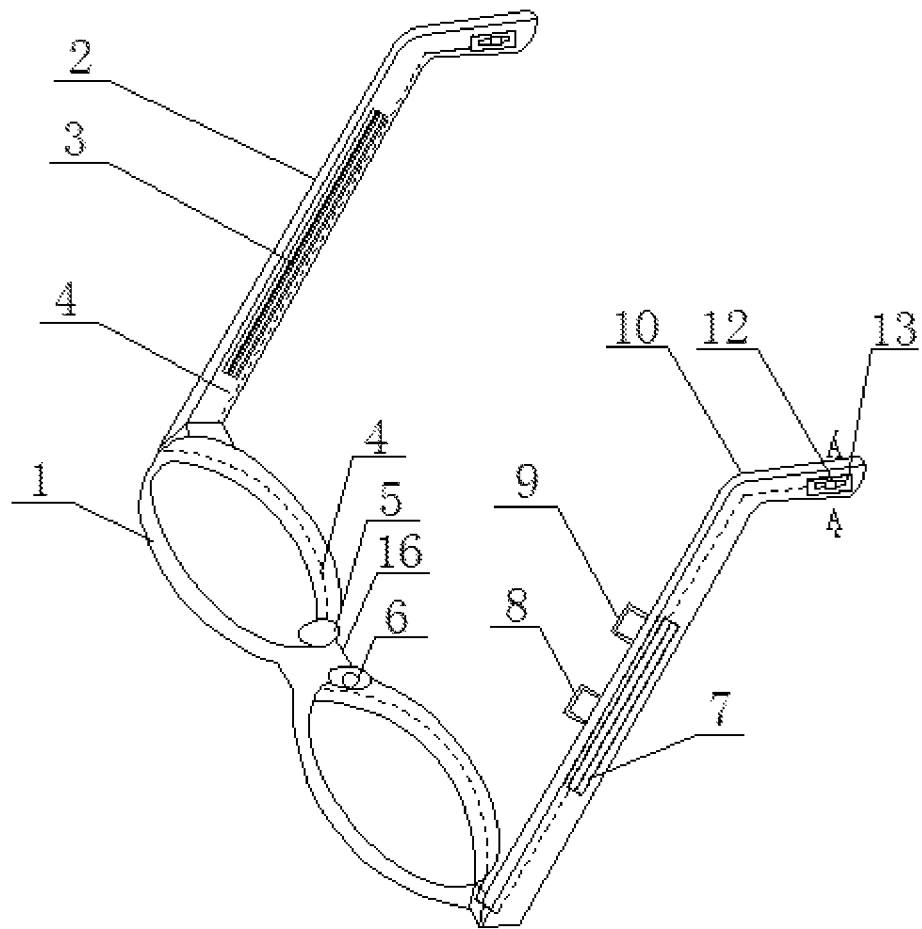
FIG. 3 is a structural schematic diagram of Embodiment 2 of the invention.
Figure 4:
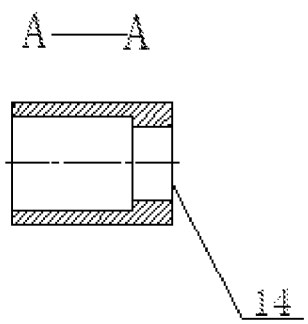
FIG. 4 is a structural schematic diagram of the stepped holes in FIG. 3.

Lightweight bone conduction Bluetooth glasses, as shown in FIG. 3-4, include glasses frames 1, glasses legs 2, glasses feet 10, a nose bridge 16 and nose pads 5, wherein a lithium battery 3 and a Bluetooth circuit board 7 are set within the glasses legs 2, bone conduction speakers 12 are set within both glasses feet 10, a microphone 6 is set on the nose pads 5, conducting wires 4 are set within the glasses frames 1, the glasses legs 2 and the glasses feet 10, and the microphone 6, the lithium battery 3, the Bluetooth circuit board 7 and the bone conduction speaker 12 are connected through the conducting wires 4. The microphone 6 set on the nose pads 5 is a bone conduction microphone. Stepped holes 14 are set within the glasses feet 10, the bone conduction speaker 12 is set in the stepped holes 14, and the diaphragm 13 is set on the bone conduction speaker 12. A touch switch button 8 and a volume adjusting button 9 are set on the glasses legs 2, the touch switch button 8 and the volume adjusting button 9 are connected with the Bluetooth circuit board 7 through the conducting wires 4, and the shape of the bone conduction speaker 12 is rectangular.

Embodiment 3

Figure 5:
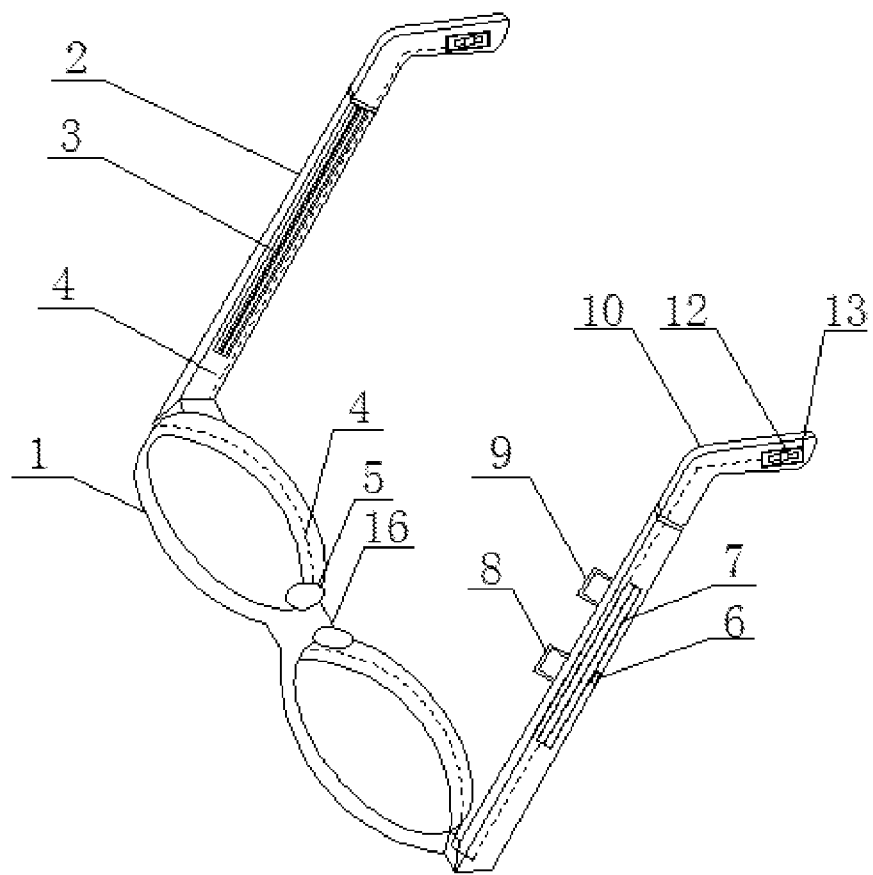
FIG. 5 is a structural schematic diagram of Embodiment 3 of the invention.
Figure 6:
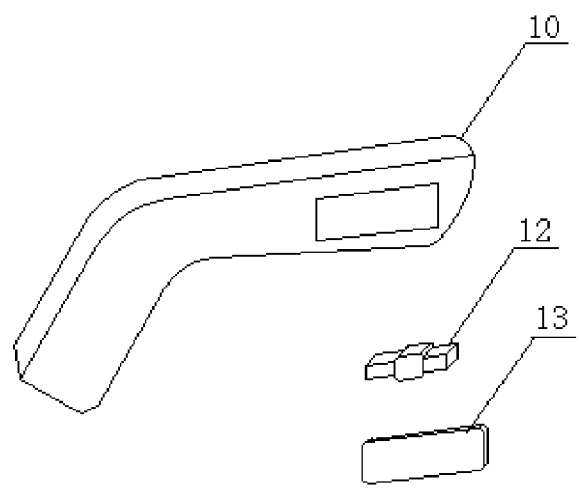
FIG. 6 is a structural schematic diagram of the glasses feet in FIG. 5.

Lightweight bone conduction Bluetooth glasses, as shown in FIG. 5-6, include glasses frames 1, glasses legs 2, glasses feet 10, a nose bridge 16 and nose pads 5, wherein a lithium battery 3 and a Bluetooth circuit board 7 are set within the glasses legs 2, bone conduction speakers 12 are set within both glasses feet 10, a microphone 6 is set within the glasses leg 2, conducting wires 4 are set within the glasses frames 1, the glasses legs 2 and the glasses feet 10, and the microphone 6, the lithium battery 3, the Bluetooth circuit board 7 and the bone conduction speaker 12 are connected through the conducting wires 4. The glasses legs 2 and the glasses feet 10 are split type, the glasses feet 10 are metal hose glasses feet, and the diaphragm 13 is set on the bone conduction speaker 12 within the glasses feet 10. A touch switch button 8 and a volume adjusting button 9 are set on the glasses legs 2, the touch switch button 8 and the volume adjusting button 9 are connected with the Bluetooth circuit board 7 through the conducting wires 4, and the shape of the bone conduction speaker 12 is rectangular.

Embodiment 4

Figure 7:
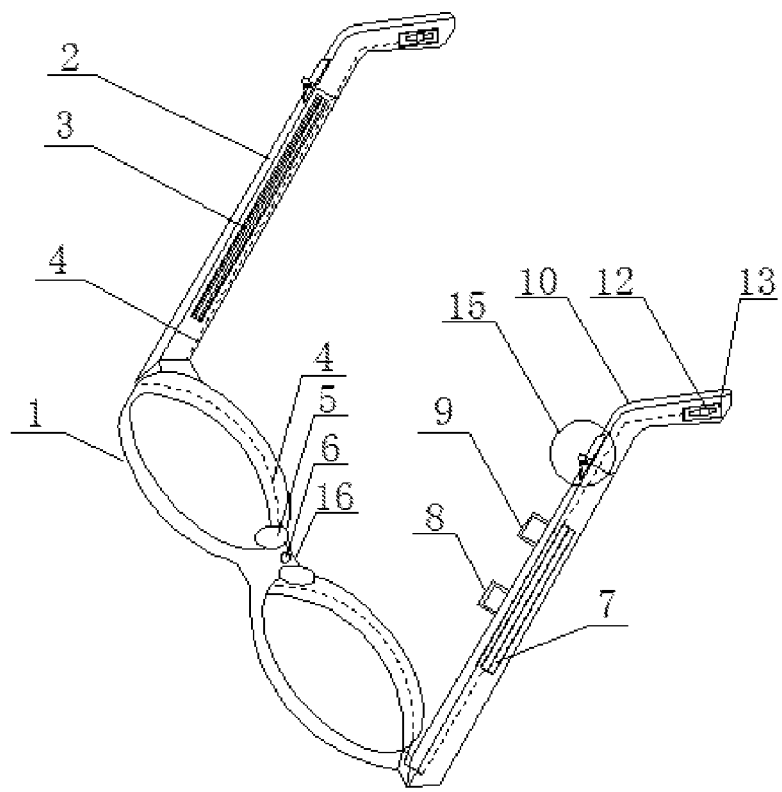
FIG. 7 is a structural schematic diagram of Embodiment 4 of the invention.
Figure 8:
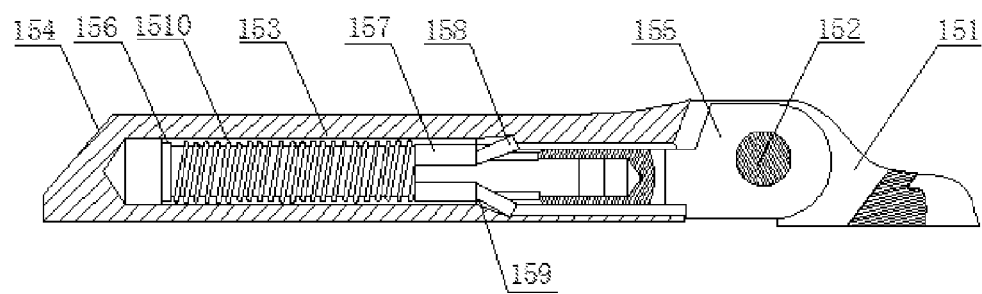
FIG. 8 is a structural schematic diagram of the spring hinge device in FIG. 7.

Lightweight bone conduction Bluetooth glasses, as shown in FIG. 7-8, include glasses frames 1, glasses legs 2, glasses feet 10, a nose bridge 16 and nose pads 5, wherein a lithium battery 3 and a Bluetooth circuit board 7 are set within the glasses legs 2, bone conduction speakers 12 are set within both glasses feet 10, a microphone 6 is set on the nose bridge 16, conducting wires 4 are set within the glasses frames 1, the glasses legs 2 and the glasses feet 10, and the microphone 6, the lithium battery 3, the Bluetooth circuit board 7 and the bone conduction speaker 12 are connected through the conducting wires 4. The glasses legs 2 and the glasses feet 10 are split type, the glasses legs 2 and the glasses feet 10 are connected by a spring hinge device 15, and the diaphragm 13 is set on the bone conduction speaker 12 within the glasses feet 10. The spring hinge device 15 includes an avicularium 151, a core assembly 153, a spring housing 154 sheathed outside the core assembly 153 and a screw 152 connecting the avicularium 151 and the core assembly 153, the core assembly 153 includes a single-teeth core 155, a mandrel 156 fixed on the single-teeth core 155, a spring 1510 sheathed on the mandrel 156 and a clamp spring 157, one end of the spring 1510 is connected to the mandrel 156, and the other end is connected to the clamp spring 157, the clamp spring 157 is a sleeve consisting of six forks 158, the clamp spring 157 is stuck in a groove 159 within the spring housing 154, the avicularium 151 is connected with the glasses legs 2, and the spring housing 154 is connected with the glasses feet 10. A touch switch button 8 and a volume adjusting button 9 are set on the glasses legs 2, the touch switch button 8 and the volume adjusting button 9 are connected with the Bluetooth circuit board 7 through the conducting wires 4, and the shape of the bone conduction speaker 12 is rectangular.

Overall, the above are only the preferred embodiments of the invention, and equivalent variations and modifications made according to the scope of the invention for patent application should fall within the scope encompassed by the invention.

The invention claimed is:

1. A lightweight bone conduction Bluetooth glasses, including glasses frames (1), glasses legs (2), glasses feet (10), a nose bridge (16) and nose pads (5), wherein, a lithium battery (3) and a Bluetooth circuit board (7) are set within the glasses legs (2), bone conduction speakers (12) are set within both glasses feet (10), a microphone (6) is set within the glasses legs (2) or on the nose bridge (16) or the nose pads (5), conducting wires (4) are set within the glasses frames (1), the glasses legs (2) and the glasses feet (10), and the microphone (3), the lithium battery, the Bluetooth circuit board (7) and the bone conduction speakers (12) are connected through the conducting wires (4);

wherein, the glasses legs (2) and the glasses feet (10) are split type, the glasses legs (2) and the glasses feet (10) are connected by a spring hinge device (15), and a diaphragm (13) is set on each bone conduction speaker (12) within the glasses feet (10); and wherein, the spring hinge device (15) includes an avicularium (151), a core assembly (153), a spring housing (154) sheathed outside the core assembly (153) and a screw (152) connecting the avicularium (151) and the core assembly (153), the core assembly (153) includes a single-teeth core (155), a mandrel (156) fixed on the single-teeth core (155), a spring (1510) sheathed on the mandrel (156) and a clamp spring (157), one end of the spring (1510) is connected to the mandrel (156), and the other end is connected to the clamp spring (157), the clamp spring (157) is a sleeve consisting of six forks (158), the clamp spring (157) is stuck in a groove (159) within the spring housing (154), the avicularium (151) is connected with the glasses leg (2), and the spring housing (154) is connected with the glasses feet (10);

the glasses feet (10) are turnable around the screw (152) to allow the bone conduction speakers (12) and the diaphragm (13) to be attached on a bone on a back of ears, the single-teeth core (155) and the clamp spring (157) clamp the spring (1510), and the glasses feet (10) are turnable back by a reset action of the spring (1510).

2. The lightweight bone conduction Bluetooth glasses according to claim 1, wherein, the microphone (6) set on the nose pads (5) is a bone conduction microphone.

3. The lightweight bone conduction Bluetooth glasses according to claim 2, wherein, stepped holes (14) are set within the glasses feet (10), each bone conduction speaker (12) is set in one of the stepped holes (14), and each bone conduction speaker (12) is waterproof, has smooth surface, and has a pushed-out position allowing the bone conduction speaker (12) and the diaphragm (13) to be attached on the bone on the back of the ears for answering a call.

4. The lightweight bone conduction Bluetooth glasses according to claim 3, wherein, a touch switch button (8) and a volume adjusting button (9) are set on the glasses legs (2), and the touch switch button (8) and the volume adjusting button (9) are connected with the Bluetooth circuit board (7) through the conducting wires (4).

5. The lightweight bone conduction Bluetooth glasses according to claim 3, wherein, the shape of the bone conduction speaker (12) is circular, rectangular or diamond.

6. The lightweight bone conduction Bluetooth glasses according to claim 2, wherein, the glasses feet (10) are metal hose glasses feet.

7. The lightweight bone conduction Bluetooth glasses according to claim 6, wherein, a touch switch button (8) and a volume adjusting button (9) are set on the glasses legs (2), and the touch switch button (8) and the volume adjusting button (9) are connected with the Bluetooth circuit board (7) through the conducting wires (4).

8. The lightweight bone conduction Bluetooth glasses according to claim 6, wherein, the shape of the bone conduction speaker (12) is circular, rectangular or diamond.

9. The lightweight bone conduction Bluetooth glasses according to claim 1, wherein, a touch switch button (8) and a volume adjusting button (9) are set on the glasses legs (2), and the touch switch button (8) and the volume adjusting button (9) are connected with the Bluetooth circuit board (7) through the conducting wires (4).

10. The lightweight bone conduction Bluetooth glasses according to claim 1, wherein, the shape of the bone conduction speaker (12) is circular, rectangular or diamond.

* * * * *